Feb. 4, 1947.   C. H. JOHNSON   2,415,181
AIR CYLINDER
Filed Dec. 21, 1943   2 Sheets-Sheet 2

Charles H. Johnson
INVENTOR.
BY
ATTORNEY.

Patented Feb. 4, 1947

2,415,181

UNITED STATES PATENT OFFICE 2,415,181

AIR CYLINDER

Charles H. Johnson, Madison, Wis., assignor to Gisholt Machine Company, Madison, Wis., a corporation of Wisconsin Application December 21, 1943, Serial No. 515,124

4 Claims. (Cl. 121—38)

1

This invention relates to air cylinders.

It has been applied to the construction of short stroke double-acting air cylinders for operating rotating chucks and the like on machine tools.

One of the objects of the invention is to simplify the packing construction, including the reduction in number of the rotary packings and the facilitating of the adjustment of the same.

Another object is to provide a piston packing of long life and one which needs no adjustment.

Another object is to provide a bearing for free rotation of the cylinder upon a stationary tubular distributor supported thereby and which supplies the air thereto.

Another object is to provide a simple construction employing only a few parts that have to be changed in changing the size of the cylinder, the remaining parts being interchangeable.

Another object is to provide a rotary cylinder that is better balanced and in which the parts are symmetrical with respect to the axis of rotation.

Another object is to provide a piston and cylinder requiring less air consumption for operation.

Other objects and features will be set forth in the description of an embodiment of the invention illustrated in the accompanying drawings.

Figure 1:
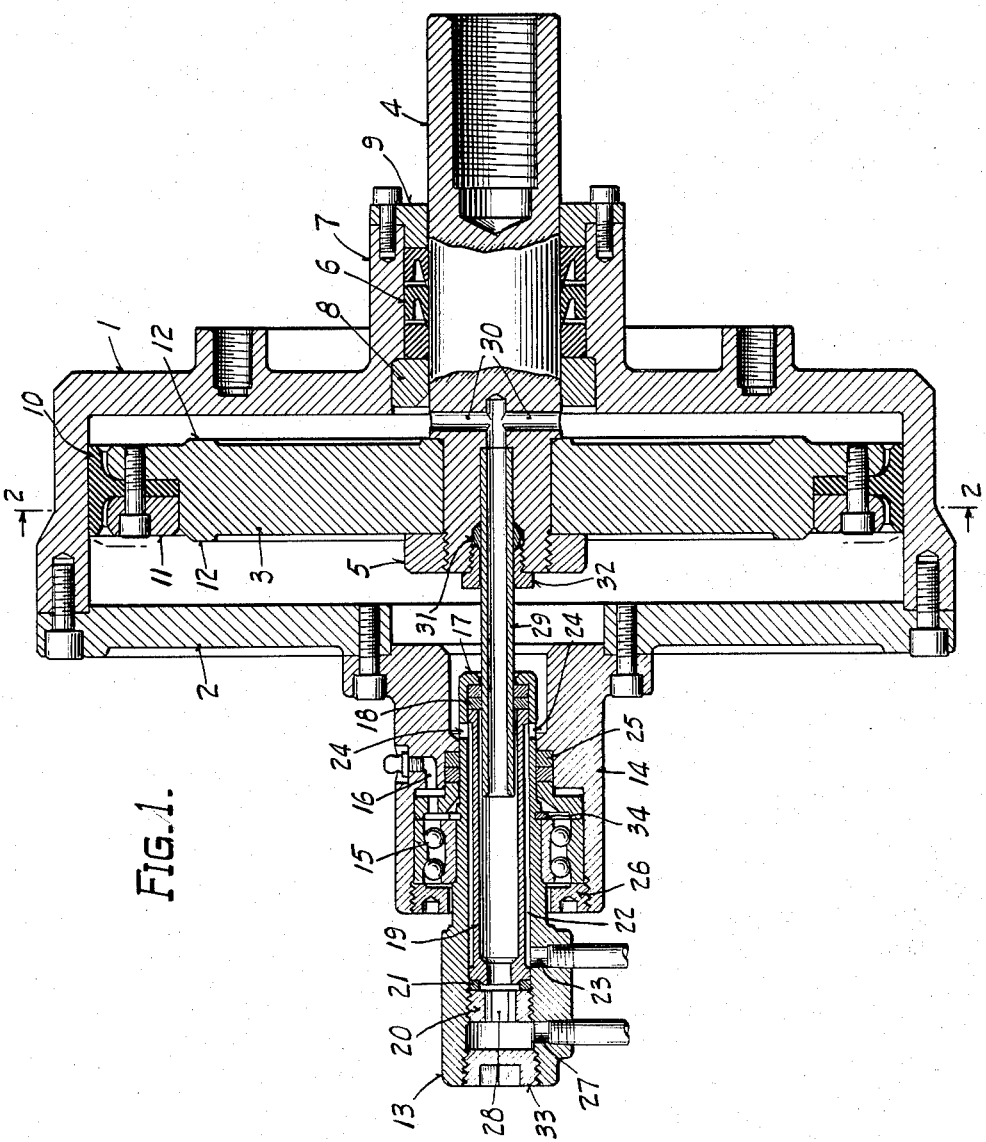
Figure 1 is a longitudinal central section through an air cylinder.
Figure 2:
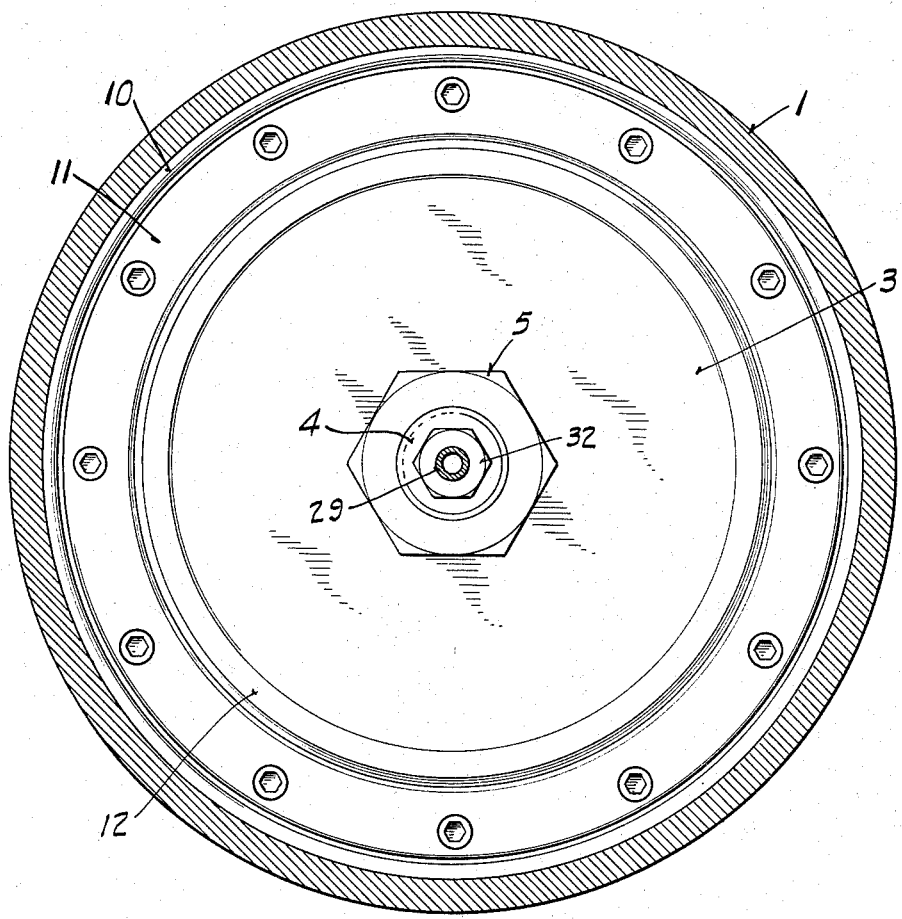
Fig. 2 is a transverse section taken through the cylinder body on line 2—2 of Fig. 1.

The air cylinder comprises a cylinder body 1 of generally cup-shape, a cylinder head 2 bolted to the rim of body 1 and a piston 3 disposed in the cylinder 1 and operable axially thereof.

A piston rod 4 is centrally secured to the piston 3 by nut 5 and extends through the end of body 1 to connect with a draw bar for operating a chuck or other device by axial movement thereof. For this purpose the outer end of the piston rod 4 may be counterbored and threaded for securement to the draw bar while the cylinder body 1 has a base with threaded bores for securing the same to the rear end of a rotating spindle.

A packing 6 encircles the piston rod 4 in a cylindrical packing housing 7 projecting from the body 1, and is confined between an inner bushing 8 and an outer follower ring 9 bolted to the outer end of housing 7.

The piston 3 is sealed against the outer cylindrical wall of body 1 by a cylinder cup 10 which is T-shaped in cross section and extends around the circumference of the piston. The cup 10 is

2 made of semi-soft fabric stiffened by plastic impregnation and is sufficiently flexible to bend under the air pressure and automatically seal the piston in the cylinder at all times. The cup 10 is secured to the piston by a follower ring 11 bolted to the piston around its circumference, the central flange of the cup being compressed axially between the follower and piston. By the use of the T-shaped cup 10, it is possible to construct the piston of less width, thereby conserving in its weight, a feature of substantial importance when high rotary speeds are employed.

The piston 3 is preferably solid and has a uniform thickness sufficient to take up substantially all of the space in the cylinder except that necessary for the relatively short operating stroke of the piston. A circular flat projection 12 may be provided on opposite sides of the plate-like piston to engage the end of body 1 and the head 2, respectively, to stop the movement of the piston at the end of its stroke.

The operation of the piston is obtained by a stationary tubular distributor 13 supported in a cylindrical distributor housing 14 bolted to head 2 and projecting axially therefrom. A suitable ball bearing 15 provides freedom of rotation of the housing 14 upon the distributor 13, the latter being supported by the housing and held against rotation with it by the conduit connections thereto. The bearing 15 may be suitably lubricated by the valved passage 16 in housing 14.

The distributor 13 constitutes a tubular casing mounted in an anti-friction bearing 15 and having an inwardly extending flange 17 at its inner end for confining a packing 18 against axial movement toward the cylinder 1. The packing 18 is compressed against flange 17 by a cylindrical spacer sleeve 19 having a flanged inner end bearing against the packing. The outer end of the sleeve 19 is similarly flanged to fit in the distributor casing 13. A lock screw 20 secures the sleeve in place with a ring gasket 21 sealing the outer end of the sleeve against the wall of distributor casing 13.

The sleeve 19 is of smaller outer diameter than the inner diameter of distributor casing 13 throughout most of the length of the sleeve to provide a passage 22 for air from the air inlet port 23 in distributor 13 to port holes 24 radially disposed near the inner end of distributor casing 13 and from thence through an enlarged diameter portion of the housing 14 into the left-hand end of cylinder 1. The compressed air is prevented from escaping past the opposite ends of the sleeve 19 by packing 18 and gasket 21, respectively. The air is prevented from escaping outwardly from between the distributor 13 and housing 14 by a packing ring 25 disposed at the inner end of bearing 15 and compressed by the threaded collar 26 which holds the bearing in place.

Compressed air is provided for the right-hand end of cylinder 1 by a port 27 near the outer end of distributor 13 and the longitudinal passage 28 through screw 20, gasket 21, and sleeve 19. A tube 29 is secured axially in the inner end of piston rod 4 and extends into the inner end of sleeve 19, the packing 18 serving to seal the outer surface of the tube with the sleeve in a manner providing for reciprocation and rotation of the tube with the piston rod.

The inner end of tube 29 connects with passages 30 in the piston rod 4 leading to the space between the piston 3 and the right-hand end of cylinder 1. The tube 29 is removable from piston rod 4 and is sealed therein by a packing 31 and flanged tube nut 32 threaded into the end of the piston and through which the tube extends.

A pipe plug 33 closes the outer end of the tubular distributor 13 and is removable to provide access to screw 20 and sleeve 19. A snap ring 34 at the inner end of bearing 15 secures the distributor casing 13 against removal of bearing 15 and of the entire distributor assembly from the housing 14. Likewise, unbolting of housing 14 from head 2 provides for removal of the distributor assembly as a unit.

The air cylinder provided by the present invention has only two rotary seals: packing 18 and packing 25. Likewise, the air cylinder has only three reciprocating seals; packing 6, packing 18 and cylinder cup 10. Rotary seals 18 and 25 are adjustable since they are of relatively small diameter and not suited for automatic sealing. The larger diameter reciprocating seals 6 and 10 are adapted for automatic sealing and need not be adjustable.

The rotating parts of the air cylinder are symmetrical and well balanced, making the cylinder particularly suited for modern high speed machine tool operation. The fewer and more simple seals provided reduce the maintenance requirements and greatly simplify the construction for manufacturing. The size of the cylinder is constant and not dependent upon packing adjustment, thereby keeping the air consumption low and reducing time delay in operation. In the construction illustrated, it has been found possible to provide a stroke for piston 3 to within about one-sixteenth of an inch of each end of the cylinder.

For different power requirements it is only necessary to replace certain parts to provide a larger or smaller diameter cylinder. These parts are the cylinder casing 1, head 2, piston 3, cup 10 and follower 11. All of the other parts of the air cylinder are interchangeable for different size units.

The invention may have various embodiments within the scope of the accompanying claims.

The invention is claimed as follows:

1. In an air cylinder of the class described, a rotary cylinder, a piston reciprocating therein, a stationary distributor comprising a tubular casing with a pair of inlet ports separated longitudinally thereof, and a sleeve having its outer end sealed against the wall of said casing between said ports and having its inner end sealed against the inner partially closed end of the distributor, said sleeve providing an axial passage inside thereof for fluid from the outer of said ports to the inner end of the distributor and a similar passage between it and the wall of the casing from the inner of said ports to a radial port in said distributor adjacent the inner end of the casing.

2. In an air cylinder of the class described, a rotary cylinder, a piston reciprocating therein, a stationary distributor comprising a tubular casing with a pair of inlet ports separated longitudinally thereof, a sleeve having its outer end sealed against the wall of said casing between said ports and having its inner end sealed against the inner partially closed end of the distributor, said sleeve providing an axial passage inside thereof for fluid from the outer of said ports to the inner end of the distributor and a similar passage between it and the wall of the casing from the inner of said ports to a radial port in said distributor adjacent the inner end of the casing, and a tube telescoped by the inner end of said distributor and sealed therewith and secured to the piston of the cylinder to reciprocate therewith and connect the same with said axial passage of said distributor.

3. In a double acting air cylinder of high power and balanced construction for high speed lathe chucks and the like, a large diameter cylinder having an axial length substantially less than its radius to provide large surface area for its piston, a piston mounted in said cylinder for axial reciprocation therein and having a substantially uniform solid thickness for balanced rotation with the cylinder, the heads of the cylinder being flat and adapted to confine said piston to its working stroke, a seal disposed centrally of the working edge of said piston to prevent the passage of air by the piston, a tubular distributor housing removably secured axially of one of said cylinder heads to rotate therewith, a non-rotatable tubular distributor disposed axially of said housing and sealed therein, said distributor having two separate air inlet ports adapted to supply compressed air alternatively to the opposite sides of said piston, an anti-friction bearing secured in said housing between the same and said distributor and serving as a thrust member to retain said distributor axially of said housing, and a telescopic connection axially between said distributor and said piston and having a passage to supply compressed air from one of said inlet ports of the distributor to the rear side of the piston, and said distributor having a passage for supplying compressed air from the other of said inlet ports of the distributor to the front side of the piston, said passages being substantially concentric with each other and radially separated by a removable sleeve sealed within the distributor.

4. In a double acting air cylinder of high power and balanced construction for high speed lathe chucks and the like, a large diameter cylinder having an axial length substantially less than its radius to provide large surface area for its piston, a piston mounted in said cylinder for axial reciprocation therein and having a substantially uniform solid thickness for balanced rotation with the cylinder, the heads of the cylinder being flat and adapted to confine said piston to its working stroke, a seal disposed centrally of the working edge of said piston to prevent the passage of air by the piston, a tubular distributor housing disposed axially of one of said cylinder heads to rotate therewith, a non-rotatable tubular distributor disposed axially of said housing and sealed therein, said distributor having two separate air inlet ports adapted to supply compressed air alternatively to the opposite sides of said piston, an anti-friction bearing secured in said housing between the same and said distributor, and a telescopic connection axially between said distributor and said piston and having a passage to supply compressed air from one of said inlet ports of the distributor to the rear side of the piston, and said distributor having a passage for supplying compressed air from the other of said inlet ports of the distributor to the front side of the piston, said passages being substantially concentric with each other and separated by a removable sleeve sealed within the distributor.

CHARLES H. JOHNSON.

REFERENCES CITED

The following references are of record in the file of this patent:

UNITED STATES PATENTS

| Number | Name | Date |
|---|---|---|
| 1,284,225 | Bogart | Nov. 12, 1918 |
| 1,656,149 | Hopkins | Jan. 10, 1928 |
| 1,684,063 | Miller | Sept. 11, 1928 |
| 1,851,723 | Neidow | Mar. 29, 1932 |
| 1,934,411 | Dahlman | Nov. 7, 1911 |
| 174,280 | Mooney | Feb. 29, 1876 |
| 2,294,331 | Douglas | Aug. 25, 1942 |
| 1,334,503 | Olson | Mar. 23, 1920 |
| 2,107,357 | Wood | Feb. 8, 1938 |